Nov. 6, 1962  J. SOMERVILLE  3,062,171
WING TIP TOW

Filed Feb. 17, 1959  2 Sheets-Sheet 1

INVENTOR.
JAMES SOMERVILLE
BY
*J. M. Smith Jr.*
ATTORNEYS

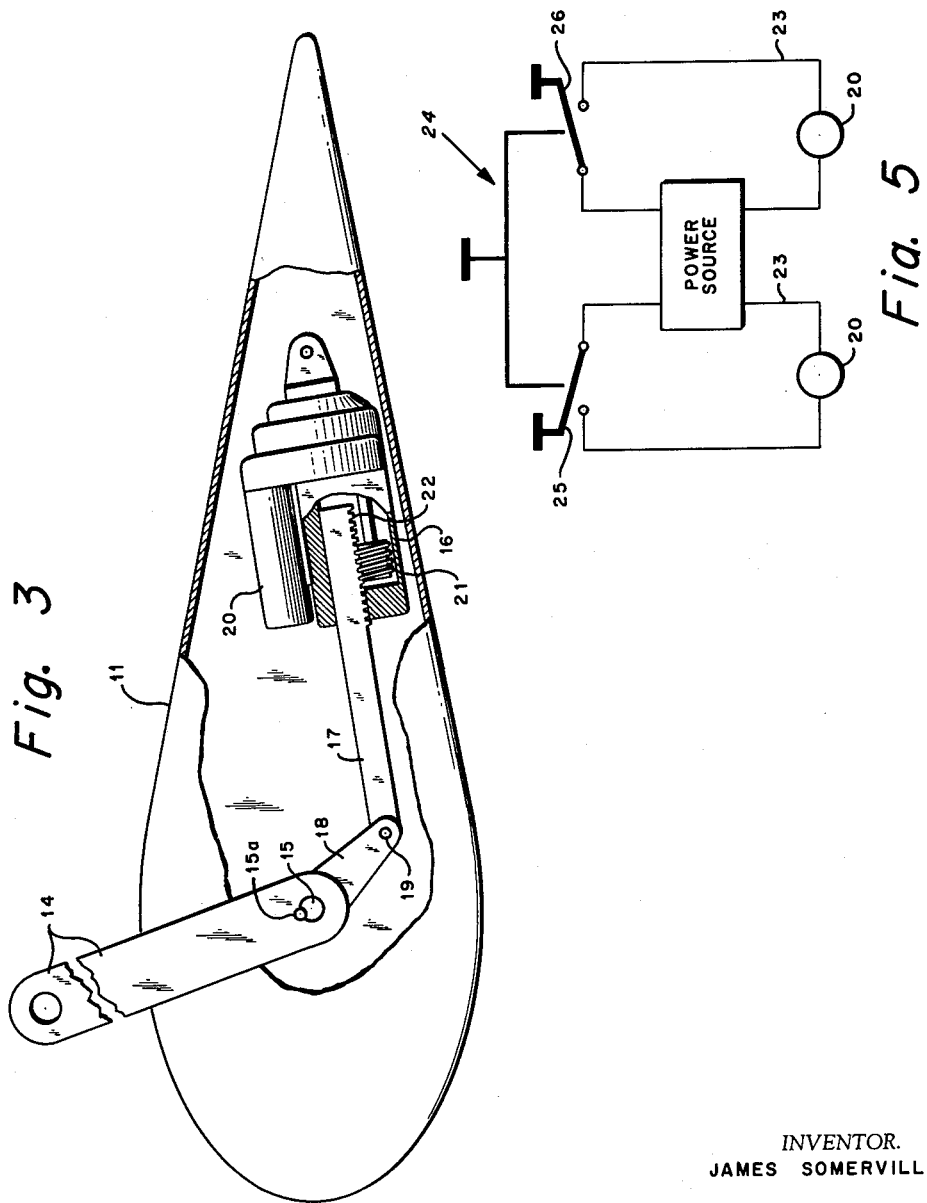

United States Patent Office 3,062,171
Patented Nov. 6, 1962

3,062,171
WING TIP TOW
James Somerville, Chalfont, Pa., assignor to the United States of America as represented by the Secretary of the Navy
Filed Feb. 17, 1959, Ser. No. 793,938
9 Claims. (Cl. 114—235)
(Granted under Title 35, U.S. Code (1952), sec. 266)

The invention described herein may be manufactured and used by or for the Government of the United States of America for governmental purposes without the payment of any royalties thereon or therefor.

This invention relates to a vehicle adapted to be towed through a fluid medium such as water or air, and more particularly to a towed object which can be controlled as to its depth in the water or altitude in the air as it is being towed by the towing craft.

In the past it has been found that it is difficult to control the depth of a vehicle which is being towed in a fluid medium, such as water, from a towing craft. It has also been found even more difficult to cause a submerged towed object to increase or decrease its depth, such as from the towing craft, since the angle of the tow line relative to the horizontal remains substantially the same. At the same time, the towed object must have sufficient stability to prevent its deviating from the tow path except as directed from the towing craft.

One of the principal objects of the invention is to provide a vehicle which can be towed in such a manner as to have a high degree of stability and which can be accurately controlled as to its altitude or depth remotely from the towing craft.

Another object of the invention is to provide a means for controlling the depth or altitude of the towed object by tilting control surfaces, planes, or fins relative to a tow line. One of the principal advantages of the invention is that since the angle of declination of the tow line remains substantially constant if the speed of the towing craft remains substantially constant, it is desirable that the control plane means be tilted relative to the tow line.

A still further object of the invention is to provide a towed object having control plane means connectable with a generally self-aligning longitudinally extending body, which control plane means are provided with control means for varying the angle of attack thereof relative to the tow line regardless of the angle of declination of the tow line.

A still further object of the invention is to provide a means for towing a vehicle that adds to and complements the stability of the towed vehicle.

A still further object of the invention is to provide a towed object having wings or fins in which the size of the wings can be increased for permitting the object to be towed at greater towing depths or altitudes relative to the towing craft. The wings form the control surfaces which extend in a lateral direction and are capable of having the attitude or angle of attack thereof remotely controlled from the towing craft.

A still further object of the invention is to provide a towed craft that comprises substantially only a wing-like control surface that can have its angle of attack varied and can be controlled, without the necessity of having a body with an empennage, preferably from a towing craft.

Yet another object of the invention is to provide a towed craft having a novel means for varying the angle of attack of control surface means of the towed craft, the control surface means being independently controlled from each lateral end tip thereof so that the control surface means are laterally stabilized as well as controlled as to elevation. In other words, the control surface cannot only vary the depth or altitude of the towed craft but can also cause the same to bank.

A still further object of the invention is to provide novel means for tilting a transversely extending control surface relative to a longitudinally extending tow line by remote control means.

A still further object of the invention is to provide a control surface having linear actuator means rigidly fixed thereto for tilting the control surface relative to a tow line through a linkage arrangement.

The invention further resides in certain novel features of construction, and combinations and arrangements of parts, and further objects and advantages thereof will be apparent to those skilled in the art to which it pertains from the following description of the present preferred embodiment thereof described with reference to the accompanying drawings in which similar reference characters represent corresponding parts throughout the several views, and in which:

FIG. 3 is an enlarged view of FIG. 2 but with parts broken away to show the actuating mechanism for varying the angle of the control surface relative to the tow line;

FIG. 5 is a schematic electrical diagram of the control circuit for the linear actuators of the invention.

Figure 1:
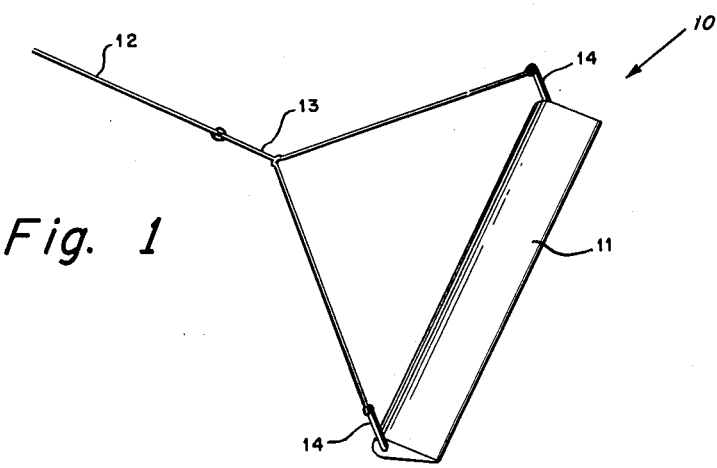
FIG. 1 is a generally pictorial view of a control surface embodying the invention being towed through a fluid medium.

It is to be understood that the invention is not limited to the details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, a towed object, indicated generally by the reference numeral 10, and embodying the invention, is comprised of a generally laterally or transversely extending control surface 11, such as a wing, plane or fin, having a foil shaped cross-section. A longitudinally extending tow line 12 is pivotally connected to the lead portion of a generally Y-shaped bridle 13. The bifurcated, trailing ends are pivotally connected to tow bars or levers 14 at each end or tip of the control surface 11. Each of the tow bars 14 by means of a round key 15a, as best seen in FIG. 3, is rigidly connected to and turns with a generally laterally extending, transverse shaft 15 which is freely journaled within the control surface 11 so that the control surface 11 is free to be pivoted or tilted about the shaft 15. Preferably the shaft 15 extends the full length of the control surface 11. However, it is to be understood that a separate pivot shaft 15 can be located in either end of the control surface 11.

The shaft 15 is adapted to be rotated through an angle relative to the control surface 11 by means of an electrical linear actuator, indicated generally by the reference numeral 16, having a linearly extensible, reciprocable rod 17 with the outer end thereof pivotally connected to an end of a crank link 18 by means of a pivot pin 19. The inner end of the crank link 18 is rigidly connected to the shaft 15 so that any angle through which the link 18 is turned will result in the turning of the tow link 14 by the same angle, since the actuator 16 is rigidly connected to the control surface 11. The actuator 16, which is electrically operated, is preferably energized from the towing craft, not shown, through lines extending between the towing and towed craft, the lines being supported by the cable 12. Although it will be understood that the linear actuator 16 can be replaced by equivalent mechanical means for performing the same general function and can be actuated or controlled by a suitable control mechanism in the control surface 11, the actuator 16 comprises a reversible electric motor 20 driving a worm 21 which is meshed with teeth 22 formed in the juxtaposed end of the rod 17. Electrical leads 23 extend from a power source in the towing craft, not shown, along the cable 12 and bridle 13 to each motor 20. A suitable switch arrangement 24 is provided so that the motors 20 can be separately controlled or in unison, FIG. 5, by respectively closing switches 25 and 26. Also it will be understood that a gear train can be connected between each link 18 and each tow bar 14 so that a predetermined angular movement of each link 18 can be translated to the connecting tow bar 14, but will result in a different angular movement of the latter.

For purposes of illustrating the invention, the control surface 11 is a symmetrical foil. However, it will be understood that other types of foils having certain lift and other desired characteristics can be substituted for the the control surface 11. For example, the control surface 11 need not be a foil at all but may be just a flat plane. This, of course, depends upon the desires of and requirements dictated to the user.

Figure 2:
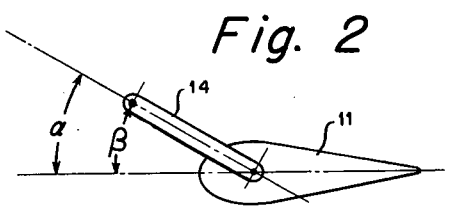
FIG. 2 is an enlarged view of one end of the control surface of FIG. 1 and shows the control surface horizontally disposed.

It has been found that the tow cable angle relative to the horizontal indicated in FIG. 2 as $a$, is relatively constant at constant towing speeds. By energizing the actuator 16 from the towing vehicle or craft, an angle B, FIG. 2, can be varied to vary the attitude of the control surface 11 relative to the horizontal. Accordingly, the altitude or depth of the towed object 10 can be varied by varying the angle B. For example, referring to FIG. 4, the angle B has been increased so that the control surface 11 is downwardly inclined for reducing the altitude or increasing the depth of the towed object 10. It will be noted by comparing FIGS. 3 and 4, that the angle $a$ which represents the angle of the cable 12 and bridle 13 with the horizontal remains substantially constant. Therefore, from the foregoing, it is apparent that the attitude of the control surface 11 can be varied relative to the tow line 12 and bridle 13.

Since in either end of the towed object 10 a separately controlled linear actuator is provided the angle B at one end of surface 11 can be made different from the angle B at the other tip end of the control surface 11. In this manner not only can the angle B be varied, but also the control surface 11 can be tilted or rolled laterally since this resuts in one end of the bridle 13 being of a different level than the other end of the bridle. The control surface 11 can, as a result, be banked which further adds to the control of the same. The degree of banking is dependent upon the tow bar lengths for a given difference in the angle B and the control surface span.

Figure 4:
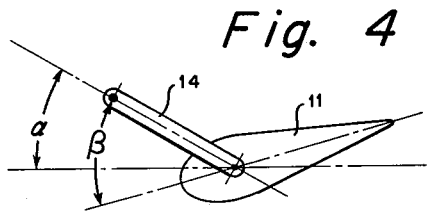
FIG. 4 is a view similar to FIG. 2 but with the control surface downwardly inclined.
Figure 6:
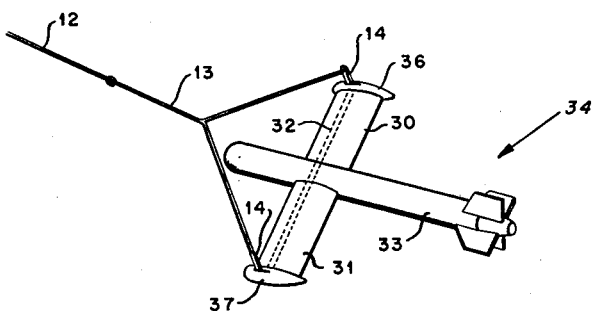
FIG. 6 is a generally pictorial view of a towed object embodying a modification of the invention.

Another embodiment of the invention is shown in FIG. 6 and comprises a pair of wing-like control surfaces 30, 31 freely and pivotally or tiltably mounted upon a single transverse shaft 32. In between the control surfaces 30 and 31 is a fuselage or body 33 having an empennage comprised of stablizing surfaces, indicated generally by reference numeral 34. The body 33 is freely pivotally mounted upon the transverse shaft 32 and is also freely pivotally mounted relative to the control surfaces 30 and 31. The tow line 12 and the bridle 13 are connected to pods 36, 37 at the outer ends of the control surfaces 30 and 31, respectively, in the same manner and with the same actuating mechanisms described with reference to FIGS. 1 through 4. In the instant embodiment, the addition of the pods 36, 37 is necessary in order to house the control mechanism comprised of the actuator 16, piston rod 17, and the crank link 18, since the control surfaces 30 and 31 are narrow and dimensionwise are not sufficiently large to properly house the mechanism required in the instant embodiment. Also, the control of the actuators 16 in FIG. 4 is similar to that described in FIGS. 1 to 4.

The body 33, being freely mounted on the shaft 32, is self-aligning for streamlining or weathercocking in the direction of the tow path or line of flight.

One of the advantages of this invention over previous means of towing an object through a fluid medium is that larger control surfaces can be used for being towed at greater depths or altitudes relative to the towing craft for a given length of tow cable. Also, the necessity for adding a stabilizing body is dispensed with, since the tow bridle is attached to the outer control surface tips rather than to the body 33. Another advantage of the invention is that the towed object can be towed with greater stability than in previously known types of towed objects.

It is intended to hereby cover not only the above mentioned modifications of the preferred constructions shown, but all adaptations, modifications, and uses thereof which come within the practice of those skilled in the art to which the invention relates, and the scope of the appended claims.

What is claimed is:

1. In an object adapted to be towed in a fluid medium, control surface means, tow line means, elongated tow bar lever means pivotally connected at one end to said control surface means, and at the other end to said tow line means, and means drivingly connected to said tow bar lever means for selectively adjusting the tilt of said control surface means relative to said tow bar lever means.

2. In an object adapted to be towed in a fluid medium, control surface means elongated in a direction generally transverse to the path of tow, a generally longitudinally extending shaft freely journaled within said control surface means, and extending from one end of said control surface means to the other end thereof, tow bar lever means rigidly connected to each end of said shaft so as to turn therewith, said tow bar lever means being adapted to be connected to a towing craft, and means for turning said shaft and tilting said control surface means relative to said shaft.

3. In an object adapted to be towed in a fluid medium, control surface means, bifurcated tow line means, a pair of tow bar lever means pivotally connected at the ends thereof to the outermost lateral extremities of said control surface means, and means drivingly connected to said tow bar lever means for tilting said control surface means relative to said tow bar lever means.

4. In an object adapted to be towed in a fluid medium, control surface means, tow line means, tow bar lever means pivotally connected at one end to said control surface means, and at the other end to said tow line means and electrically operated linear actuator means for tilting said control surface means relative to said tow bar lever means.

5. In an object adapted to be towed in a fluid medium by a towing craft, control surface means, tow line means, tow bar lever means pivotally connected at one end to said control surface means and at the other end to said tow line means, and electrically actuated means fixed to said control surface means and connected to said tow bar lever means for angularly positioning said control surface means relative to said tow bar lever means and changing the attitude of said control surface means.

6. In an object as set forth in claim 5, wherein said electrically actuated means each comprises a linear actuator means having a housing fixed to said control surface means and having a linearly reciprocable actuator rod, link means each rigidly connected to one of said tow bar lever means and pivotally connected to said linearly reciprocable actuator rod for translating the linear movement of said actuator rod to angular movement of said tow bar lever means.

7. In an object as set forth in claim 5, electrical conduit means extending from said electrically actuated means to the towing craft so that said electrically actuated means can be controlled from the towing craft.

8. In an object adapted to be towed in a fluid medium with a tow line having bifurcated trailing ends, body means, wing-like control surface means pivotally connected to said body means and extending outwardly therefrom, tow line means, tow bar lever means pivotally connected at one end to said control surface means and at the other end to said tow line means, and means drivingly connected to said tow bar lever means for controllably pivoting said control surface means relative to said tow bar lever means and incrementally changing the attitude of said control surface means.

9. In an object as set forth in claim 8 wherein said tow bar lever means comprise two tow bars connected to the opposite and outermost lateral tips of said control surface means, and said tow bars are each adapted to be connected to the bifurcated trailing ends of the tow line.

References Cited in the file of this patent

UNITED STATES PATENTS

| | | |
|---|---|---|
| 1,358,358 | Burney | Nov. 9, 1920 |
| 2,385,392 | Van Dusen | Sept. 25, 1945 |
| 2,524,863 | White | Oct. 10, 1950 |
| 2,589,312 | Wilcoxon | Mar. 18, 1952 |
| 2,679,227 | Symonds | May 25, 1954 |
| 2,729,910 | Fryklund | Jan. 10, 1956 |
| 2,870,748 | Hemphill | Jan. 27, 1959 |

FOREIGN PATENTS

| | | |
|---|---|---|
| 1,050,562 | France | Sept. 2, 1953 |